United States Patent
Shimazaki

(10) Patent No.: US 8,810,609 B2
(45) Date of Patent: Aug. 19, 2014

(54) MOBILE TERMINAL, A PEEKING PREVENTION METHOD AND A PROGRAM FOR PEEKING PREVENTION

(75) Inventor: Mamoru Shimazaki, Tokyo (JP)

(73) Assignee: NEC Corporation, Tokyo (JP)

(*) Notice: Subject to any disclaimer, the term of this patent is extended or adjusted under 35 U.S.C. 154(b) by 164 days.

(21) Appl. No.: 13/144,486

(22) PCT Filed: Dec. 14, 2009

(86) PCT No.: PCT/JP2009/071081
§ 371 (c)(1),
(2), (4) Date: Jul. 13, 2011

(87) PCT Pub. No.: WO2010/084678
PCT Pub. Date: Jul. 29, 2010

(65) Prior Publication Data
US 2011/0273490 A1    Nov. 10, 2011

(30) Foreign Application Priority Data
Jan. 26, 2009  (JP) ................................. 2009-014431

(51) Int. Cl.
*G09G 5/10*   (2006.01)
(52) U.S. Cl.
USPC ......................................... 345/690; 345/204
(58) Field of Classification Search
CPC ....................................................... G09G 5/10
USPC ...................... 345/89, 690, 62, 77, 204–205
See application file for complete search history.

(56) References Cited

U.S. PATENT DOCUMENTS

| | | | | |
|---|---|---|---|---|
| 2007/0075950 A1* | 4/2007 | Yamada et al. | | 345/89 |
| 2007/0146356 A1* | 6/2007 | Ladouceur | | 345/207 |
| 2008/0068305 A1* | 3/2008 | Tada | | 345/77 |
| 2008/0198118 A1 | 8/2008 | Choi | | |

FOREIGN PATENT DOCUMENTS

| | | |
|---|---|---|
| CN | 1755460 A | 4/2006 |
| JP | 2003150291 A | 5/2003 |
| JP | 2005077638 A | 3/2005 |
| JP | 2007102160 A | 4/2007 |
| JP | 2008020750 A | 1/2008 |
| JP | 2008-281768 A | 11/2008 |
| TW | 200714975 | 4/2007 |

OTHER PUBLICATIONS

European search report for 09838868.9 mailed on Nov. 7, 2012.

(Continued)

*Primary Examiner* — Andrew Sasinowski
(74) *Attorney, Agent, or Firm* — Sughrue Mion, PLLC

(57) ABSTRACT

A mobile terminal includes user setting unit 101, data conversion unit 106 and display alteration unit 107. A user setting unit 101 sets which conversion data to use as the conversion data for converting a contrast difference in data for display out of a plurality of conversion data. Also, data conversion unit 106 performs processing which makes the contrast difference in the data for display small using the conversion data set by user setting judgment unit 104. Also, display alteration unit 107 alters a displayed content on a display screen based on the data for display converted by data conversion unit 106, and sets which conversion data to use as the conversion data for converting the contrast difference in the data for display out of a plurality of conversion data. By performing processing which makes the contrast difference in the data for display small using the set conversion data, peeking from the surroundings is prevented.

11 Claims, 19 Drawing Sheets

(56) References Cited

OTHER PUBLICATIONS

International Search Report for PCT/JP2009/071081 mailed Jan. 26, 2010.

The Extended European Search Report for EP Application No. 13153116.2 dated on Apr. 24, 2013.

Chinese Office Action for CN Application No. 200980155511.8 dated on Apr. 3, 2013 with English Translation.

Japanese Office Action for JP Application No. 2010-547411 mailed on Feb. 4, 2014 with English Translation.

* cited by examiner

Fig.4

| ADDRESS (ORIGINAL DATA) | R (6bit) | G (6bit) | B (6bit) |
|---|---|---|---|
| 0 | R0 | G0 | B0 |
| 1 | R1 | G1 | B1 |
| 2 | R2 | G2 | B2 |
| 3 | R3 | G3 | B3 |
| 4 | R4 | G4 | B4 |
| ⋮ | ⋮ | ⋮ | ⋮ |
| 61 | R61 | G61 | B61 |
| 62 | R62 | G62 | B62 |
| 63 | R63 | G63 | B63 |

Fig.5

| | | NORMAL DISPLAY PRIVACY ANGLE OFF | | |
|---|---|---|---|---|
| ADDRESS (ORIGINAL DATA) | R (6bit) | G (6bit) | B (6bit) | |
| 0 | 0 | 0 | 0 | BLACK |
| 1 | 1 | 1 | 1 | ↑ |
| 2 | 2 | 2 | 2 | |
| 3 | 3 | 3 | 3 | |
| 4 | 4 | 4 | 4 | |
| ⋮ | ⋮ | ⋮ | ⋮ | |
| 61 | 61 | 61 | 61 | |
| 62 | 62 | 62 | 62 | ↓ |
| 63 | 63 | 63 | 63 | WHITE |

Fig.7

| | | WHITE GROUP PRIVACY ANGLE ON | | |
|---|---|---|---|---|

| ADDRESS (ORIGINAL DATA) | R (6bit) | G (6bit) | B (6bit) | |
|---|---|---|---|---|
| 0 | 32 | 32 | 32 | GRAY |
| 1 | 32 | 32 | 32 | ↑ |
| 2 | 33 | 33 | 33 | |
| 3 | 33 | 33 | 33 | |
| 4 | 34 | 34 | 34 | |
| ⋮ | ⋮ | ⋮ | ⋮ | |
| 61 | 62 | 62 | 62 | |
| 62 | 62 | 62 | 62 | ↓ |
| 63 | 63 | 63 | 63 | WHITE |

Fig.9

BLACK GROUP
PRIVACY ANGLE ON

| ADDRESS (ORIGINAL DATA) | R (6bit) | G (6bit) | B (6bit) | |
|---|---|---|---|---|
| 0 | 0 | 0 | 0 | BLACK |
| 1 | 0 | 0 | 0 | ↑ |
| 2 | 1 | 1 | 1 | |
| 3 | 1 | 1 | 1 | |
| 4 | 2 | 2 | 2 | |
| ⋮ | ⋮ | ⋮ | ⋮ | |
| 61 | 30 | 30 | 30 | |
| 62 | 31 | 31 | 31 | ↓ |
| 63 | 31 | 31 | 31 | GRAY |

Fig.16

INTERMEDIATE COLOR GROUP
PRIVACY ANGLE ON

| ADDRESS (ORIGINAL DATA) | R (6bit) | G (6bit) | B (6bit) | |
|---|---|---|---|---|
| 0 | 16 | 16 | 16 | GRAY (DARK) |
| 1 | 16 | 16 | 16 | ↑ |
| 2 | 17 | 17 | 17 | |
| 3 | 17 | 17 | 17 | |
| 4 | 18 | 18 | 18 | |
| ⋮ | ⋮ | ⋮ | ⋮ | |
| 61 | 46 | 46 | 46 | |
| 62 | 47 | 47 | 47 | ↓ |
| 63 | 47 | 47 | 47 | GRAY (LIGHT) |

MOBILE TERMINAL, A PEEKING PREVENTION METHOD AND A PROGRAM FOR PEEKING PREVENTION

TECHNICAL FIELD

The present invention relates to a mobile terminal, a peeking prevention method and a program for peeking prevention.

BACKGROUND ART

A user uses a mobile terminal such as a mobile phone (hereinafter, described as a PDA) at various places as in public transport such as a train or a bus, or at public facilities and so on. Accordingly, the PDA is used in an environment where other person is present. In such an environment, there is a case that other person peeks at a display screen of the FDA and this is undesirable from a view point of privacy protection. Accordingly, the PDA equipped with a peeking prevention function which can make a display screen difficult to see from a surrounding area by making a contrast difference in data for display displayed on a display unit of the PDA small is proposed.

For example, technology which, by setting an operation mode to a narrow view mode, makes a gradation difference of a display screen small and makes a display screen of the PDA difficult to peek at is disclosed by Japanese Patent Application Laid-Open No. 2008-20750. Also, technology which alters a display mode of a display screen of the PDA (such as character size or contrast) according to user's characteristics of mind and body (body-and-soul) or a usage environment is disclosed by Japanese Patent Application Laid-Open No. 2003-150291.

DISCLOSURE OF INVENTION

Problems to be Solved by the Invention

There are various methods as techniques to adjust a contrast in order to prevent peeking. For example, there is a method to make a contrast difference small so that a display screen may near black overall. Also, there is a method to make a contrast difference small so that a display screen may near white overall.

In case a contrast difference is set small so that a display screen may near black overall, when surroundings of the PDA is light, the display screen becomes difficult to see even if the PDA is seen from the front. Thus, when surroundings are light, it is desirable for the contrast difference to be adjusted so that the display screen of the PDA may near white overall.

On the other hand, when surroundings are dark, in case a contrast difference is set small so that a display screen may near white overall, the display screen becomes difficult to see even if the PDA is seen from the front. Thus, when surroundings are dark, it is desirable for the contrast difference to be adjusted so that the display screen may near black overall.

In a peeking prevention method of the PDA disclosed in Japanese Patent Application Laid-Open No. 2008-20730 and so on, setting of whether to use a peeking prevention function is possible. However, in case the peeking prevention function is made effective, a method of adjustment (hereinafter, called as adjustment of color tone) where a display screen on which a contrast difference is displayed is adjusted to near black or is adjusted to near white, is set uniquely to the PDA. Accordingly, a user cannot adjust a color tone according to his taste or a usage environment.

Also if technology which Japanese Patent Application Laid-Open No. 2003-150291 discloses is used overall contrast and so on of a display screen can be altered according to user's taste or a usage environment. However, peeking cannot be prevented.

Accordingly, a main object of the present invention is, in a mobile terminal having a peeking prevention function, to provide a mobile terminal, a peeking prevention method and a program for pecking prevention which can prevent peeking in a mode meeting user's taste and easy to see.

Means for Solving the Problems

A mobile terminal of the present invention is characterized by including: a conversion data setting unit which sets which conversion data to use as the conversion data for converting a contrast difference in data for display out of a plurality of conversion data; a data conversion unit which performs processing which makes the contrast difference in the data for display small using the conversion data set by the conversion data setting unit; and a display alteration unit which alters a displayed content on a display screen based on the data for display converted by the data conversion unit.

Another mode of a mobile terminal according to the present invention is characterized by including: a conversion data judgment unit which judges surrounding illumination using an illumination sensor, and judges which conversion data to use as the conversion data for converting a contrast difference in data for display based on the judged illumination out of a plurality of conversion data; a data conversion unit which performs processing which makes the contrast difference in data for display small using the conversion data judged by the conversion data judgment unit; and a display alteration unit which alters a displayed content on a display screen based on the data for display converted by the data conversion unit.

A peeking prevention method according to the present invention is characterized by including: a conversion data setting step which sets which conversion data to use as the conversion data for converting a contrast difference in data for display out of a plurality of conversion data; a data conversion step which performs processing which makes the contrast difference in the data for display small using the set conversion data; and a display alteration step which alters a displayed content on a display screen based on the converted data for display.

Another mode of a peeking prevention method according to the present invention is characterized by including: a conversion data judgment step which judges surrounding illumination using an illumination sensor, and judges which conversion data to use as the conversion data for converting a contrast difference in data for display based on the judged illumination out of a plurality of conversion data; a data conversion step which performs processing which makes the contrast difference in data for display small using the judged conversion data; and a display alteration step which alters a displayed content on a display screen based on the converted data for display.

A program for peeking prevention according to the present invention is to make a computer execute: conversion data setting processing which sets which conversion data to use as the conversion data for converting a contrast difference in data for display out of a plurality of conversion data data conversion processing which performs processing which makes the contrast difference in the data for display small using the set conversion data; and display alteration processing which alters a displayed content on a display screen based on the converted data for display.

Another mode of a program for peeking prevention according to the present invention is to make a computer execute: conversion data judgment processing which judges surrounding illumination using an illumination sensor, and judges which conversion data to use as the conversion data for converting a contrast difference in data for display based on the judged illumination out of a plurality of conversion data; data conversion processing which performs processing which makes the contrast difference in data for display small using the judged conversion data; and display alteration processing which alters a displayed content on a display screen based on the converted data for display.

Advantages of the Invention

According to the present invention, as conversion data for converting a contrast difference in data for display, which conversion data to use out of a plurality of conversion data is set.

And by performing processing which makes the contrast difference in the data for display small using the set conversion data, peeking of a mobile terminal from surroundings is prevented.

Accordingly, it is possible to prevent peeking from surroundings in a mode meeting user's taste and easy to see.

BRIEF DESCRIPTION OF THE DRAWINGS

FIG. 4 is a data conversion table which is used when data for display according to the second exemplary embodiment is outputted to a display unit.

FIG. 5 is a data conversion table in case a display processing unit according to the second exemplary embodiment performs conversion at normal time which does not change a contrast difference in data for display.

FIG. 7 is a white group data conversion table in case a display processing unit according to the second exemplary embodiment makes a contrast difference in data for display small so that it may near white overall.

FIG. 9 is a black group data conversion table in case a display processing unit according to the second exemplary embodiment makes a contrast difference in data for display small so that it may near black overall.

FIG. 16 is an intermediate color group data conversion table in case a display processing unit according to the third exemplary embodiment makes a contrast difference in data for display small so that it may near an intermediate color overall.

BEST MODE FOR CARRYING OUT THE INVENTION

The outline of a mobile terminal (hereinafter, described as a PDA) using a peeking prevention method according to the present invention is as follows. The PDA includes a peeking prevention function for preventing peeking by adjusting a contrast difference in data for display displayed on a display unit. In case the peeking prevention function is set as effective, a user can set a method of adjustment of a color tone of the display unit arbitrary in advance.

Also, another mode of the present invention includes, in the PDA including a peeking prevention function using a contrast difference in data for display displayed on a display unit, in case the peeking prevention function is set as effective, a function where a method of adjustment of a color tone of the display unit is altered automatically based on illumination sensed by an illumination sensor.

Also, this PDA includes a function which can set a threshold value to the PDA in advance for altering the method of adjustment of the color tone of the display unit automatically based on the illumination sensed by the illumination sensor.

Also, this PDA includes a function which can set several threshold values to the PDA in advance for altering the method of adjustment of the color tone of the display unit automatically based on the illumination sensed by the illumination sensor.

By the structure mentioned above, by setting the peeking prevention function to prevent peeking by adjusting the contrast difference in data for display as effective, peeking is prevented in a mode meeting user's taste and easy to see (a color tone of a display color which is easy to see for a user)

Also, by changing a display state to a mode meeting user's taste and easy to see automatically based on the illumination sensed by the illumination sensor, peeking from surroundings can be prevented.

Also, several threshold values in case of altering the method of adjustment of the color tone automatically based on the illumination sensed by the illumination sensor can be set.

Accordingly, in case peeking is prevented by adjusting the contrast difference, it is possible to make the display state of the display unit to the color tone meeting user's taste and easy to see, and also to alter the color tone automatically based on the illumination sensed by the illumination sensor. As a result, the PDA easy to use for a user is provided.

A First Exemplary Embodiment

Figure 1:
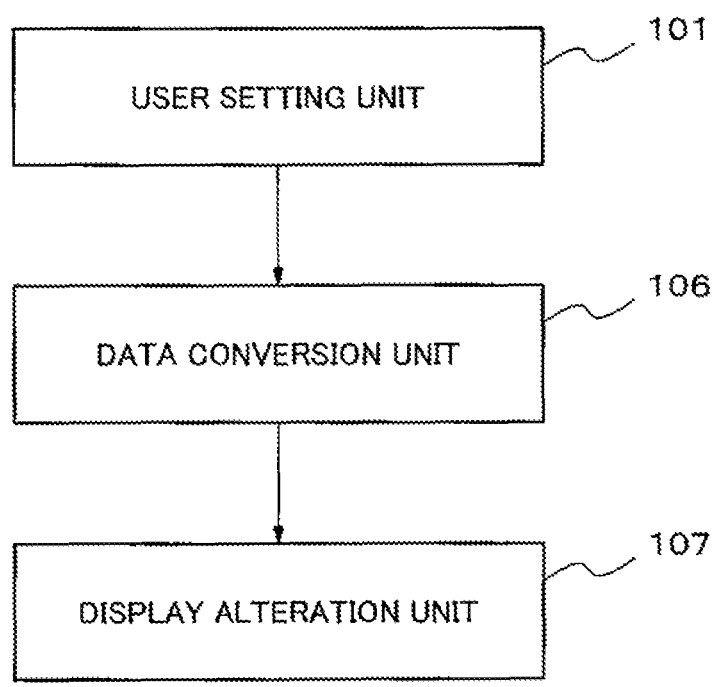
FIG. 1 is a block diagram of a mobile terminal using a peeking prevention method according to a first exemplary embodiment of the present invention.

A first exemplary embodiment of the present invention will be described. FIG. 1 is a block diagram of the PDA using a peeking prevention method according to the first exemplary embodiment of the present invention.

As indicated in FIG. 1, as minimum components, the PDA includes user setting unit 101, data conversion unit 106 and display alteration unit 107. The user setting unit 101 sets which conversion data to use as the conversion data for converting a contrast difference in data for display out of a plurality of conversion data. Also, the data conversion unit 106 performs processing which makes the contrast difference in the data for display small using the conversion data set by the user setting unit 101. Also, the display alteration unit 107 alters a display based on the data for display converted by the data conversion unit 106.

Thus, as the conversion data for converting the contrast difference in the data for display, one conversion data among a plurality of conversion data is set. And processing which makes the contrast difference in the data for display small is performed using the set conversion data. Accordingly, peeking is prevented in a mode meeting user's taste and easy to see.

A Second Exemplary Embodiment

Figure 2:
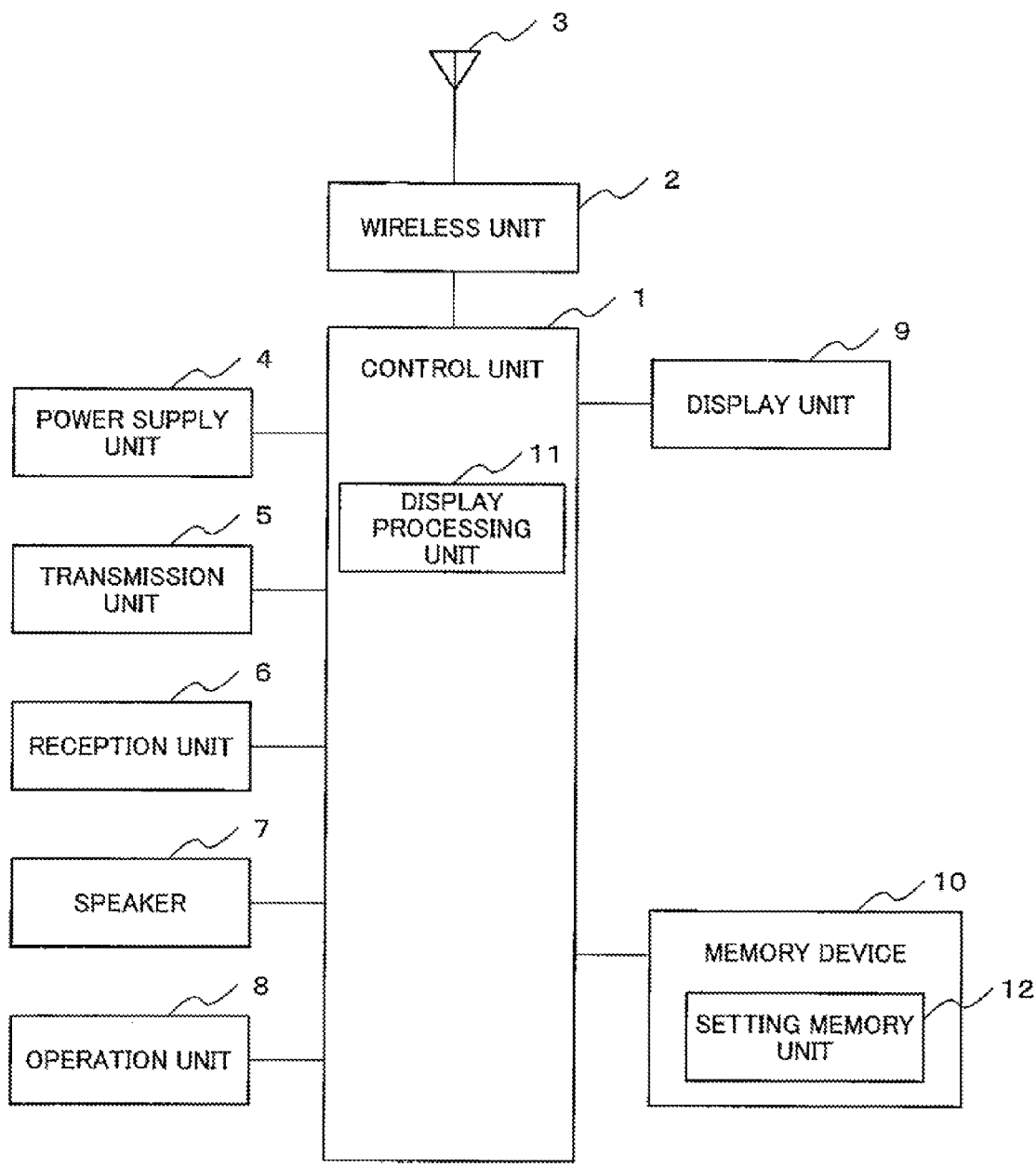
FIG. 2 is a block diagram of a mobile terminal using a peeking prevention method according to a second exemplary embodiment of the present invention.

The second exemplary embodiment of the present invention will be described. FIG. 2 is a block diagram of the PDA according to the second exemplary embodiment. Further, in this exemplary embodiment, although the PDA is described taking a cellular phone as an example, a PHS (Personal Handy-phone System) terminal and so on is also fine.

The PDA includes a control unit 1, a wireless unit 2, an antenna unit 3, a power supply unit 4, a transmission unit 5, a reception unit 6, a speaker 7, an operation unit 8, a display unit 9 and a memory device 10. As indicated in FIG. 2, the PDA includes the control unit 1 and the wireless unit 2. Various data is transmitted and received between the control unit 1 and the wireless unit 2. The antenna unit 3 used for transmitting and receiving of a wireless signal is connected to the wireless unit 2. And a wireless signal is transmitted and received following control of the control unit 1.

The control unit 1 includes a CPU (Central Processing Unit) which operates following a program, and the power supply unit 1, the transmission unit 5, the reception unit 6, the speaker 7, the operation unit 8, the display unit 9 and the memory device 10 are connected to it. The control unit 1 transmits and receives various data with the power supply unit 4, the transmission unit 5, the reception unit 6, the speaker 7, the operation unit 8, the display unit 9 and the memory device 10.

The power supply unit 4 supplies electric power to the PDA. The transmission unit 5 converts a voice signal which a user utters into an electric signal and outputs it to the control unit 1. By converting an electric signal from the control unit 1 into a voice signal and outputting it, the reception unit 6 brings communication partner's voice to the user. By outputting sound such as music, sound, voice and information sound, the speaker 7 brings various information to the user. The operation unit 8 is used in order to perform operation of transmission and reception of the PDA or operation of various functions. The display unit 9 displays various information following control of the control unit 1.

The memory device 10 is realized by a storage medium such as a memory and stores various data such as information which indicates a state of the PDA. The control unit 1 includes a display processing unit 11 which converts data for display outputted to the display unit 9. The memory device 10 stores conversion data and a setting value used at a time of conversion processing by the display processing unit 11 and includes setting memory unit 12 storing various setting information of the PDA.

Further, because connection or a structure concerning a wireless communication system which communicates between the wireless unit 2 in the PDA indicated in FIG. 2 and each base station and so on is a publicly known technique, its description will be omitted.

Figure 3:
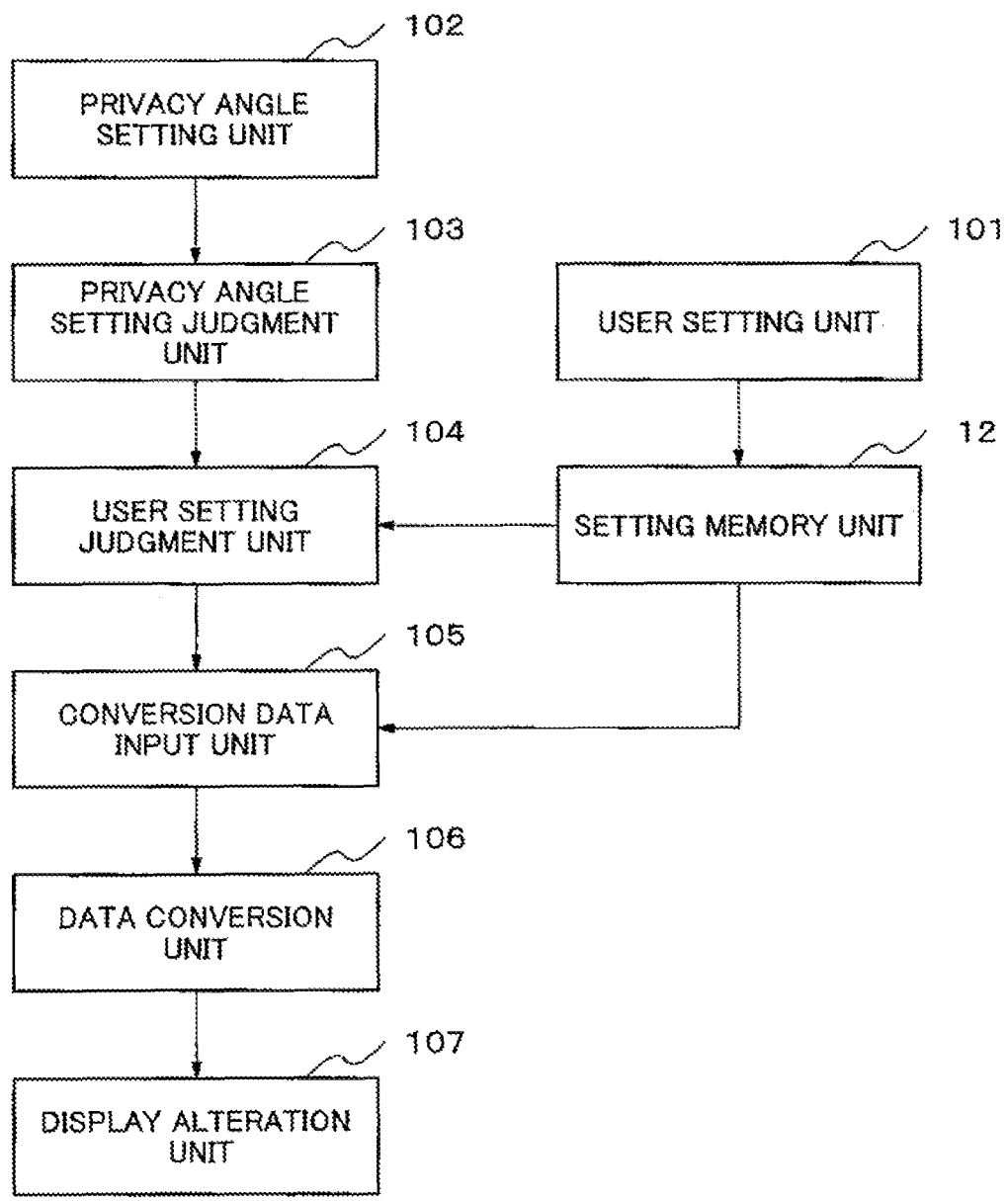
FIG. 3 is a functional block diagram of a mobile terminal using a peeking prevention method according to the second exemplary embodiment.

Next, a functional structure of the RDA using a peeking prevention method will be described. FIG. 3 is a functional block diagram of the PDA using the peeking prevention method.

The PDA includes a user setting unit 101, a setting memory unit 12, a privacy angle setting unit 102, a privacy angle setting judgment unit 103, a user setting judgment unit 104, a conversion data input unit 105, a data conversion unit 106 and a display alteration unit 107.

The setting memory unit 12 stores conversion data for altering a contrast difference in data for display. According to the second exemplary embodiment, the setting memory unit 12 stores, as conversion data, white group conversion data, black group conversion data and data for normal display. White group conversion data is conversion data for making the contrast difference small so that a display screen may near white overall. Black group conversion data is conversion data for making the contrast difference small so that a display screen may near black overall. Data for normal display is conversion data which does not change the contrast difference in the data for display.

Also, the setting memory unit 12 stores setting information which shows which of white group conversion data or black group conversion data to use as conversion data used when peeking prevention processing is performed, as the user setting data information. Also, the setting memory unit 12 stores setting information which shows to which of on state or off state the peeking prevention function (hereinafter, privacy angle) is set, as the privacy angle setting information.

The user setting unit 101 is realized by a CPU of the PDA which operates following a program and the operation unit 8. The user setting unit 101 sets, following user's operation, which of white group conversion data or black group conversion data to use as the conversion data used when peeking prevention processing is performed. For example, in case setting is made to the effect that while group data is used, the user setting unit 101 updates (for example, alter the set value) the user setting data information stored in the setting memory unit 12 so that white group data may be applied. Also, in case setting is made to the effect that black group data is used, the user setting unit 101 updates (for example, alter the set value) the user setting data information stored in the setting memory unit 12 so that black group data may be applied.

The privacy angle setting unit 102 is realized by a CPU of the PDA which operates following a program and the operation unit 8. The privacy angle setting unit 102 sets a privacy angle to on state or off state following a user's operation. For example, in case the privacy angle is set to on state, the privacy angle setting unit 102 updates (for example, alter the set value) the privacy angle setting information stored in the setting memory unit 12 so that on state may be applied.

Also, in case the privacy angle is set to off state, the privacy angle setting unit 102 updates (for example, alter the set value) the privacy angle setting information stored in the setting memory unit 12 so that off state may be applied.

The privacy angle setting judgment unit 103 is realized by a CPU of the PDA which operates following a program. The privacy angle setting judgment unit 103 judges whether the privacy angle is set to on state or off state by the privacy angle setting unit 102.

The user setting judgment unit 104 is realized by a CPU of the PDA which operates following a program. When it is judged that the privacy angle is set by the privacy angle setting judgment unit 103 as on state, the user setting judgment unit 104 judges which of white group conversion data or black group conversion data is set as the conversion data.

For example, the user setting judgment unit 104 judges to which of white group conversion data or black group conversion data the user setting data information which the setting memory unit 12 stores is set.

The conversion data input unit 105 is realized by a CPU of the PDA which operates following a program. The conversion data input unit 105 reads white group conversion data or black group conversion data from the setting memory unit 12 based on the judgment result of the user setting judgment unit 104.

Further, in case the privacy angle is judged to be set to off state by the privacy angle setting judgment unit 103, the user setting judgment unit. 104 reads data for normal display from the setting memory unit 12 as the conversion data.

The data conversion unit 106 is realized by a CPU of the PDA which operates following a program. The data conversion unit 106 converts the data for display based on the conversion data which the conversion data input unit 105 read so that the contrast difference may become small.

The display alteration unit 107 is realized by a CPU of the PDA which operates following a program and the display unit 9. The display alteration unit 107 alters a displayed content displayed on the display unit 9 based on the data for display converted by the data conversion unit 106. That is, in case the privacy angle is set to on state, the display alteration unit 107 alters the display of the display unit 9 so that the contrast difference may become small based on the data for display after conversion. As a result, the display screen of the PDA is controlled so that it may become difficult to peek.

Processing performed by the data conversion unit 106 and the display alteration unit 107 is, for example, performed by the display processing unit 11 indicated in FIG. 2.

Further, in this exemplary embodiment, the memory device 10 of the PDA stores various programs for performing peeking prevention processing. For example, the memory device of the PDA stores a program for peeking prevention which makes a computer execute: conversion data setting processing which sets which conversion data to use as the conversion data for converting a contrast difference in data for display out of a plurality of conversion data, data conversion processing which performs processing which makes the contrast difference in the data for display small using the set conversion data; and display alteration processing which alters a displayed content on a display screen based on the converted data for display.

Next, operation will be described. First, a case where the display processing unit 11 stores (for example, stores in RAM and so on provided in the control unit 11) conversion data when information is displayed on the display unit 9, will be described.

FIG. 4 is a data conversion table which is used when data for display is outputted to the display unit 9. In FIG. 4, red, green and blue of pixel data for display are indicated by R, G and B respectively. Also, a case when each color data is 6 bits and total is 18 bits of pixel data for display is indicated. And the display processing unit 11 converts the data for display before conversion following an address and using the table indicated in FIG. 4, and generates RGB data after conversion. For example, when the address of the data for display before conversion is "2" and it is data of "red", the display processing unit 11 makes the data after conversion "R2". Further, actually, the display processing unit 11 performs data conversion concerning each of R, G and B.

FIG. 5 is a data conversion table in case the display processing unit 11 performs conversion at normal time which does not change a contrast difference in data for display. Here, it is supposed that RGB data nears black when the numerical value is small, and nears white when the numerical value is large.

In case a normal display is performed, because the numerical value of RGB for data before conversion and data after conversion is the same numerical value, the data for display same as the original data may be outputted to the display unit 9 as a result. That is, in FIG. 5, a case when a privacy angle is in off state is indicated.

Figure 6:
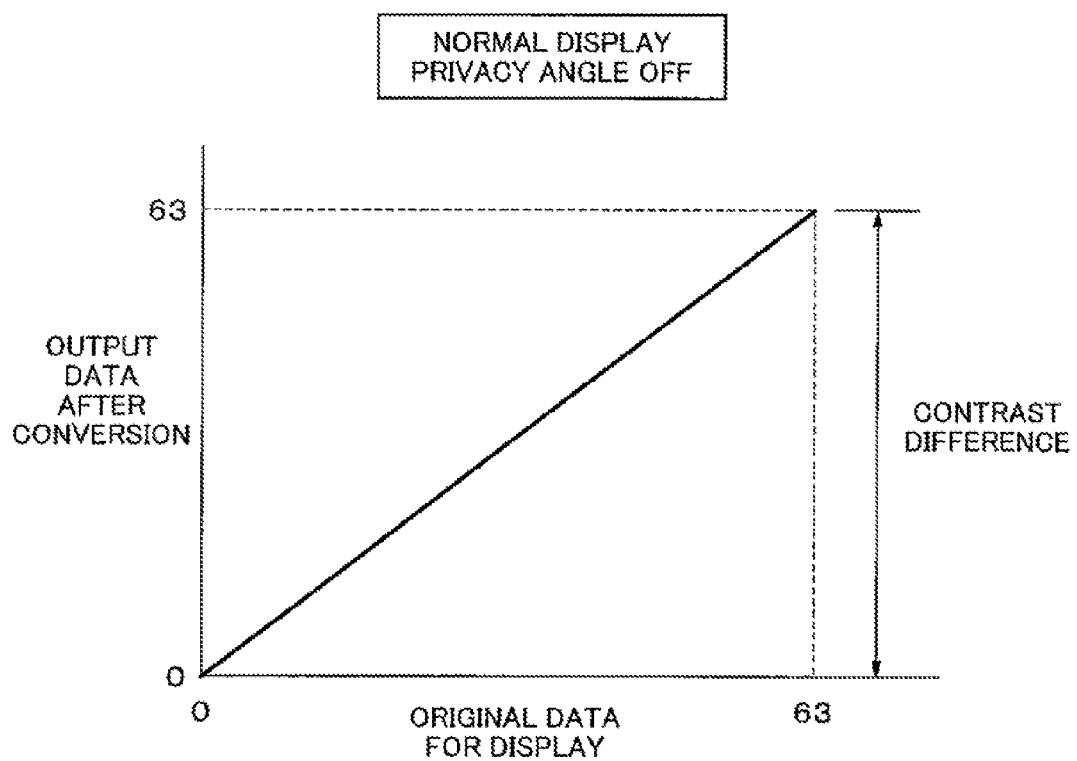
FIG. 6 is a figure showing output data after conversion of data for display at normal time according to the second exemplary embodiment.

FIG. 6 indicates output data after conversion of the data for display at normal time. In FIG. 6, original data for the display before conversion is represented along a horizontal axis, and output data after conversion is represented along a vertical axis. As indicated in FIG. 6, a contrast difference in pixels which output data after conversion can express is same as the contrast difference in the original data and is in 64 stages from 0 to 63.

FIG. 7 is a white group data conversion table in case the display processing unit 11 makes the contrast difference in the data for display small so that it may near white overall. That is, in FIG. 7, a case where the privacy angle is set to on state and when white group conversion data is used as the conversion data is indicated. As indicated in FIG. 7, in case it is set so that white group conversion data may be used, data conversion is performed so that the contrast difference in the data is made small overall against the original data and the numerical value of RGB may near a white group.

Figure 8:
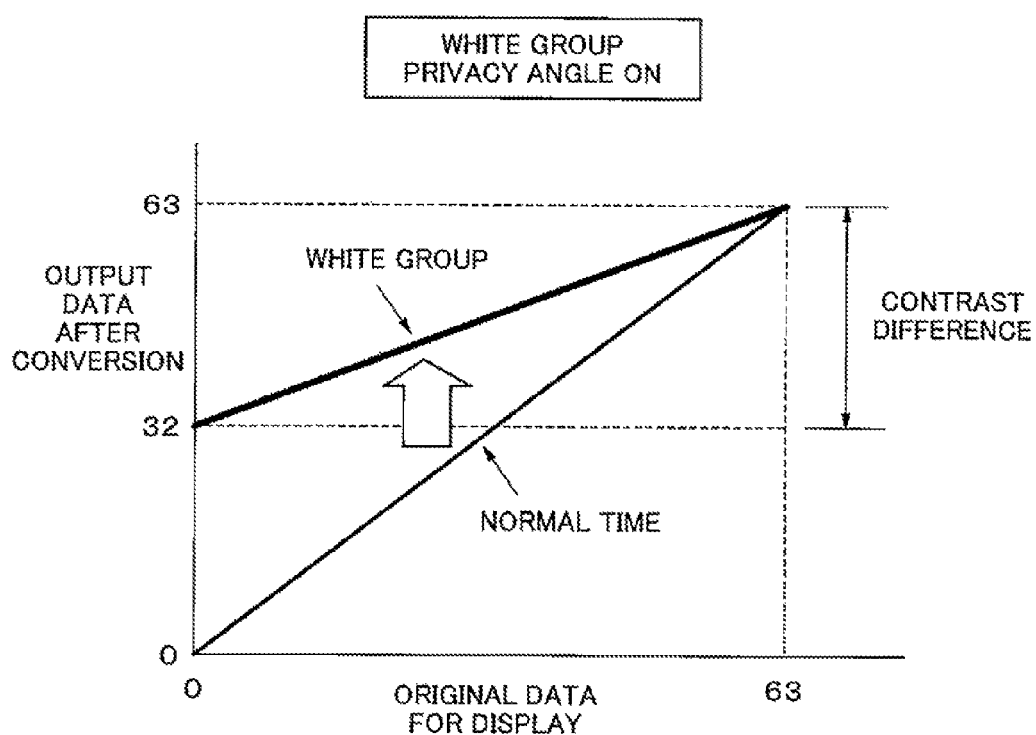
FIG. 8 is a figure showing output data after converting data for display using white group conversion data according to the second exemplary embodiment.

FIG. 8 is a figure showing output data after converting the data for display using white group conversion data. Further, in FIG. 8, output data at normal time and output data which is converted using white group conversion data are indicated together for comparison. Further, output data at normal time is output data after conversion when the privacy angle is set to off state. Output data which is converted using white group conversion data is output data after conversion when the privacy angle is in on state and in case white group conversion data is used.

As indicated in FIG. 8, while the contrast difference in output data at normal time is in 64 stages from 0 to 63, the contrast difference in output data of the white group is in 32 stages from 32 to 63. Accordingly, the contrast difference after conversion becomes small and it becomes difficult for the content on the display screen of the FDA to be seen from surroundings (peeking prevention effect can be obtained).

Further, in FIG. 8, a case is indicated when the contrast difference after conversion becomes half of the difference in the numerical values of RGB of the original data. However, to which extent the contrast difference may be made small is not limited to the one indicated in this exemplary embodiment and, for example, one which makes it small to ⅓ or ⅔ of the difference in the numerical values of RGB of the original data may also be fine.

FIG. 9 is a black group data conversion table in case the display processing unit 11 makes the contrast difference in the data for display small so that it may near black overall. That is, in FIG. 9, a case where the privacy angle is set to on state and when black group conversion data is used as the conversion data is indicated. As indicated in FIG. 9, in case black group conversion data is used, data conversion is performed so that the contrast difference in the data is made small overall against the original data and the numerical value of RGB may near a black group.

Figure 10:
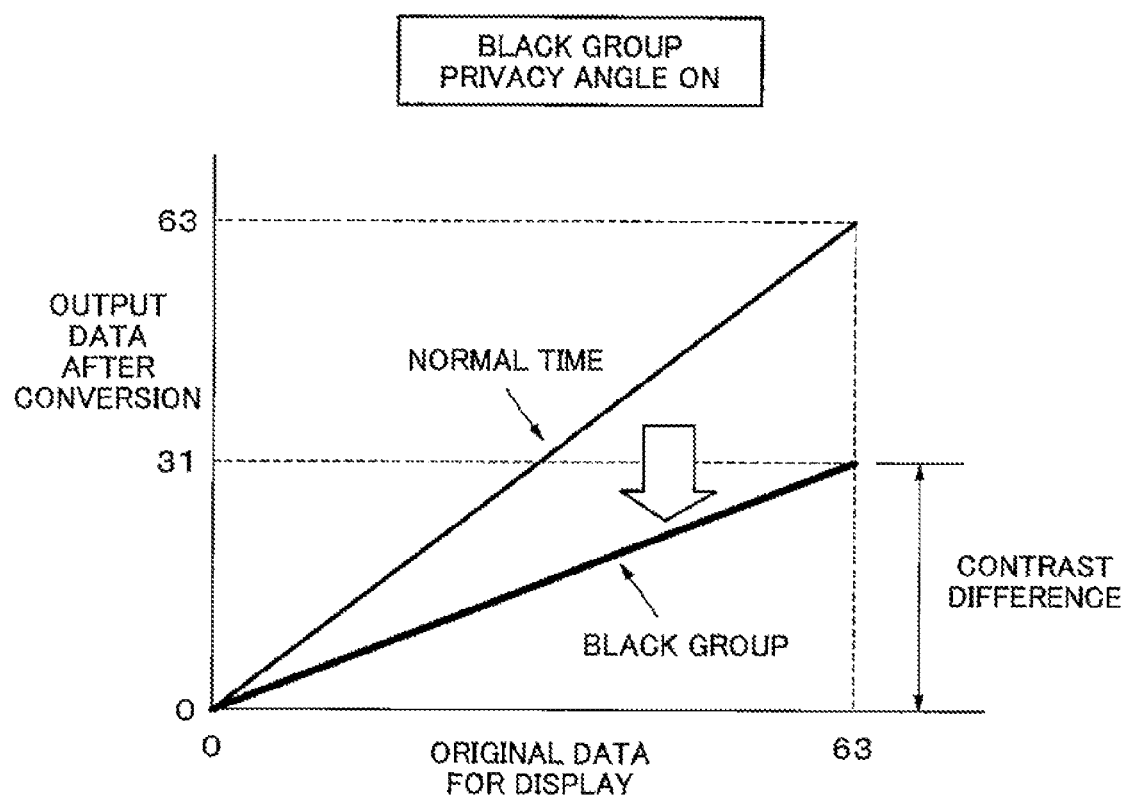
FIG. 10 is a figure showing output data after converting data for display using black group conversion data according to the second exemplary embodiment.

FIG. 10 is a figure showing output data after converting data for display using black group conversion data. Further, in FIG. 10, output data at normal time and output data which is converted using black group conversion data are indicated together for comparison. Further, output data at normal time is output data after conversion when the privacy angle is set to off state. Output data which is converted using black group conversion data is output data after conversion when the privacy angle is in on state and in case black group conversion data is used.

As indicated in FIG. 10, while the contrast difference in output data at normal time is in 64 stages from 0 to 63, the contrast difference in output data in case black group conversion data is used is in 32 stages from 0 to 31. Accordingly, the contrast difference after conversion becomes small and it becomes difficult for the content on the display screen of the PDA to be seen from surroundings (peeking prevention effect can be obtained).

Further, in FIG. 10, a case is indicated when the contrast difference after conversion becomes half of the numerical value of RGB of the original data. However, to which extent the contrast difference may be made small is not limited to the one indicated in this exemplary embodiment and, for example, one which makes it small to ⅓ or ⅔ of the difference in the numerical values of RGB of the original data may also be fine.

Figure 11:
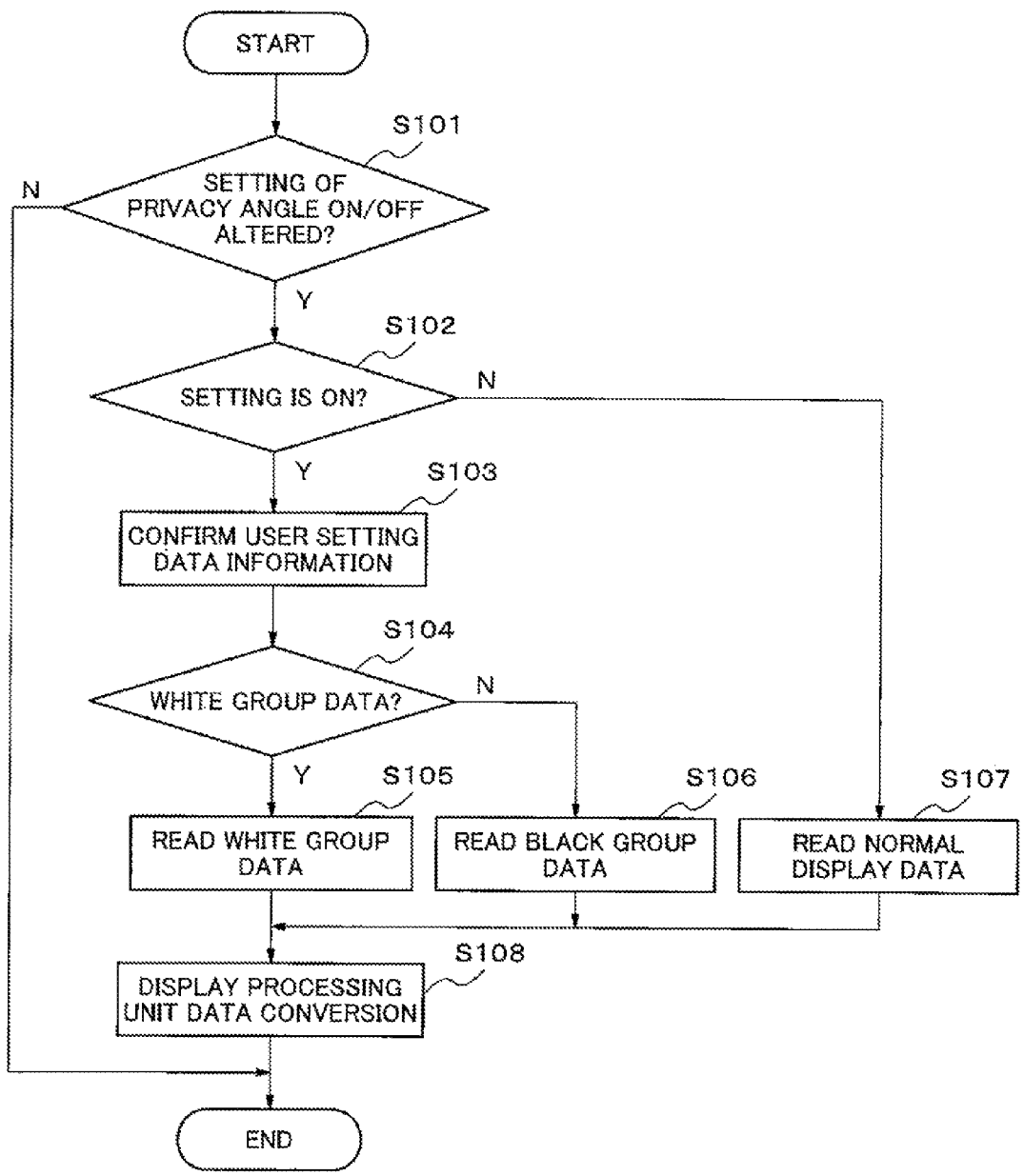
FIG. 11 is a flow chart of peeking prevention processing in a mobile terminal according to the second exemplary embodiment.

FIG. 11 is a flow chart showing an example of a peeking prevention processing which a control unit performs. In case a user wants to set a privacy angle to on state or off state, he performs setting which makes the privacy angle into on state or off state. By this user setting, the control unit sets the privacy angle to on state or off state by updating privacy angle setting information which the setting memory unit 12 stores and so on.

Also, in case of setting the privacy angle to on state, a user further sets which of white group conversion data or black group conversion data to use as conversion data which is used when peeking prevention processing is performed. By this user setting, the control unit sets which of white group conversion data or black group conversion data to use by updating user setting data information and so on which the setting memory unit 12 stores.

Further, the control unit may set in advance, before the privacy angle is set, by updating the user setting data information and so on which the setting memory unit 12 stores, which of white group conversion data or black group conversion data to use.

The control unit judges, at predetermined timing, whether setting of on/off of the privacy angle is altered (Step S101). For example, by making privacy angle's being set as a trigger, contents of the privacy angle setting information stored in the setting memory unit 12 are confirmed, and whether the setting of on/off of the privacy angle is altered is judged. Further, the control unit may confirm the contents of the privacy angle setting information stored in the setting memory unit 12 at each predetermined time, and may judge whether the setting of on/off of the privacy angle is altered.

The control unit finishes processing just at that moment when it judges in Step S101 that the setting of the privacy angle is not altered. Also, in case it judges in Step S101 that the setting of the privacy angle is altered, the control unit transitions to processing of Step S102.

Next, in Step S102, the control unit judges whether the privacy angle is altered to on state. In case it judges that it was altered to on state, the control unit confirms user setting data information stored in the setting memory unit 12 (Step S103).

According to the second exemplary embodiment, as is mentioned above, when the privacy angle is set to on state, the user setting data information for setting which of white group conversion data or black group conversion data to use is stored in the setting memory unit 12. A user can set the contents of this user setting data information arbitrary in advance.

Next, the control unit judges based on the user setting data information whether it is set to use white group conversion data (Step S104).

In case it is set so that white group conversion data may be used, the control unit transitions to processing of Step S105. And the control unit reads white group conversion data from the setting memory unit 12 as the conversion data (Step S105).

In case it is not set to use white group conversion data in Step S104 (that is, it is set to use black group conversion data), the control unit transitions to processing of Step S106.

And the control unit reads black group conversion data from the setting memory unit 12 as the conversion data (Step S106).

In case it judges in Step S102 that the privacy angle is set to off state, the control unit transitions to processing of Step S107. That is, this case is when setting of the privacy angle is altered from on state to off state. Therefore, the control unit reads normal display data at normal time from the setting memory unit 12 (Step S107).

Next, the control unit stores (for example, stores in RAM and so on provided in the control unit 11) data read in Steps S105, S106 or S107 as a table for data conversion using the display processing unit 11. And the control unit makes the contrast difference small by converting the data for display displayed on the display unit 9 based on the table for data conversion stored in the display processing unit 11, and outputs the data for display after conversion to the display unit 9 (Step S108).

In case white group conversion data is used, the control unit makes a display on the display unit 9 based on output data indicated in FIG. 7 and FIG. 8. Also, in case black group conversion data is used, the control unit makes a display on the display unit 9 based on output data indicated in FIG. 9 and FIG. 10. Also, in case normal display data is used, the control unit makes a display on the display unit 9 based on output data indicated in FIG. 5 and FIG. 6.

Further, in case it judges that the privacy angle is set to off state, the control unit does not perform conversion processing of Step S108, and may output the data for display to the display unit 9 just as it is. By so doing, normal display data becomes unnecessary, and a processing load can be reduced.

As described above, according to this exemplary embodiment, conversion data for converting a contrast difference in data for display is set according to a user operation. And by performing processing which makes the contrast difference in the data for display small by using the set conversion data, peeking can be prevented. That is, by setting a privacy angle function as effective, a method to adjust a color tone of a display screen of the display unit 9 can be set arbitrary. Accordingly, peeking from surroundings can be prevented in a mode meeting user's taste and easy to see, and usability can be improved.

A Third Exemplary Embodiment

Figure 12:
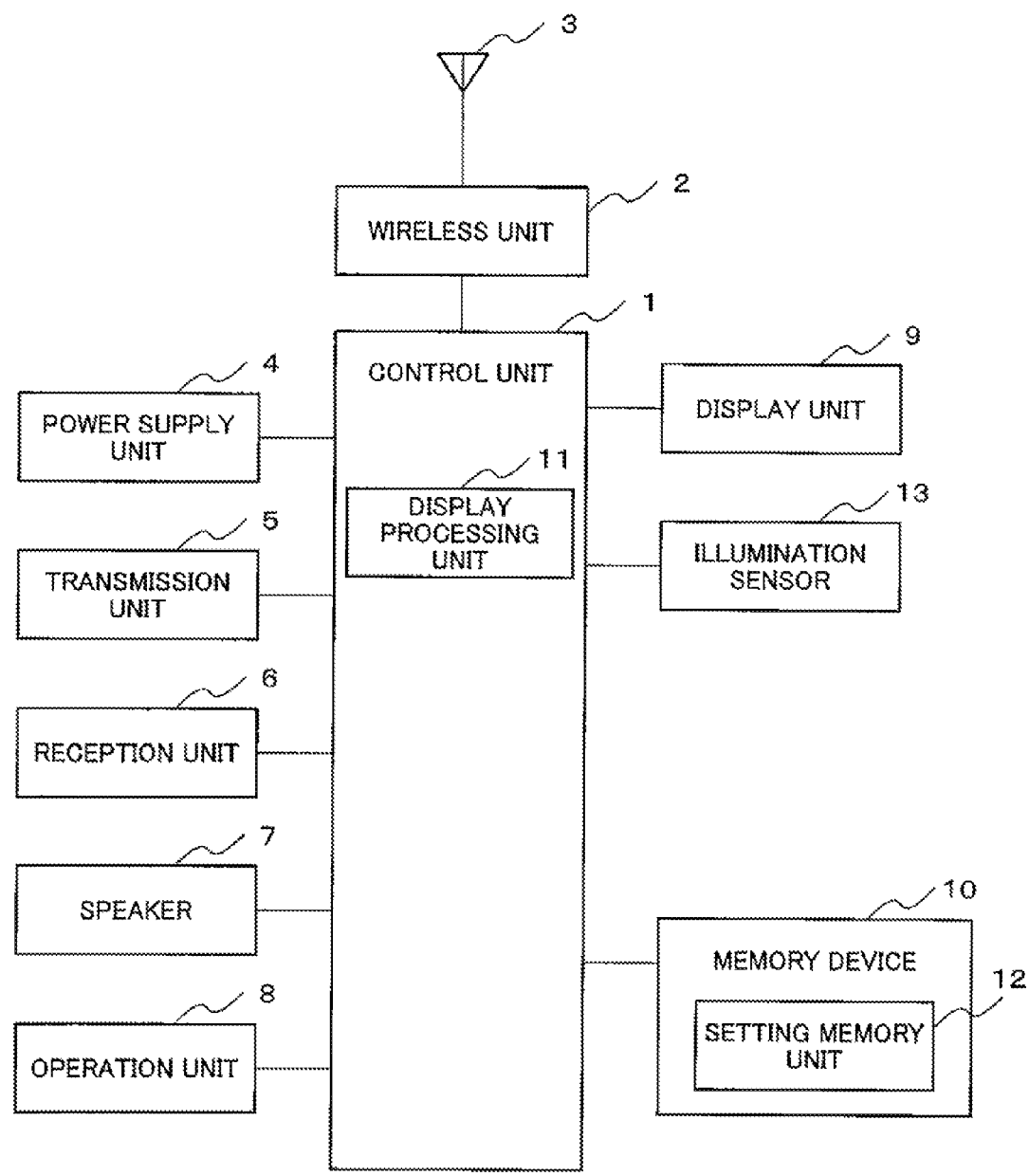
FIG. 12 is a block diagram of a mobile terminal using a peeking prevention method according to a third exemplary embodiment of the present invention.
Figure 13:
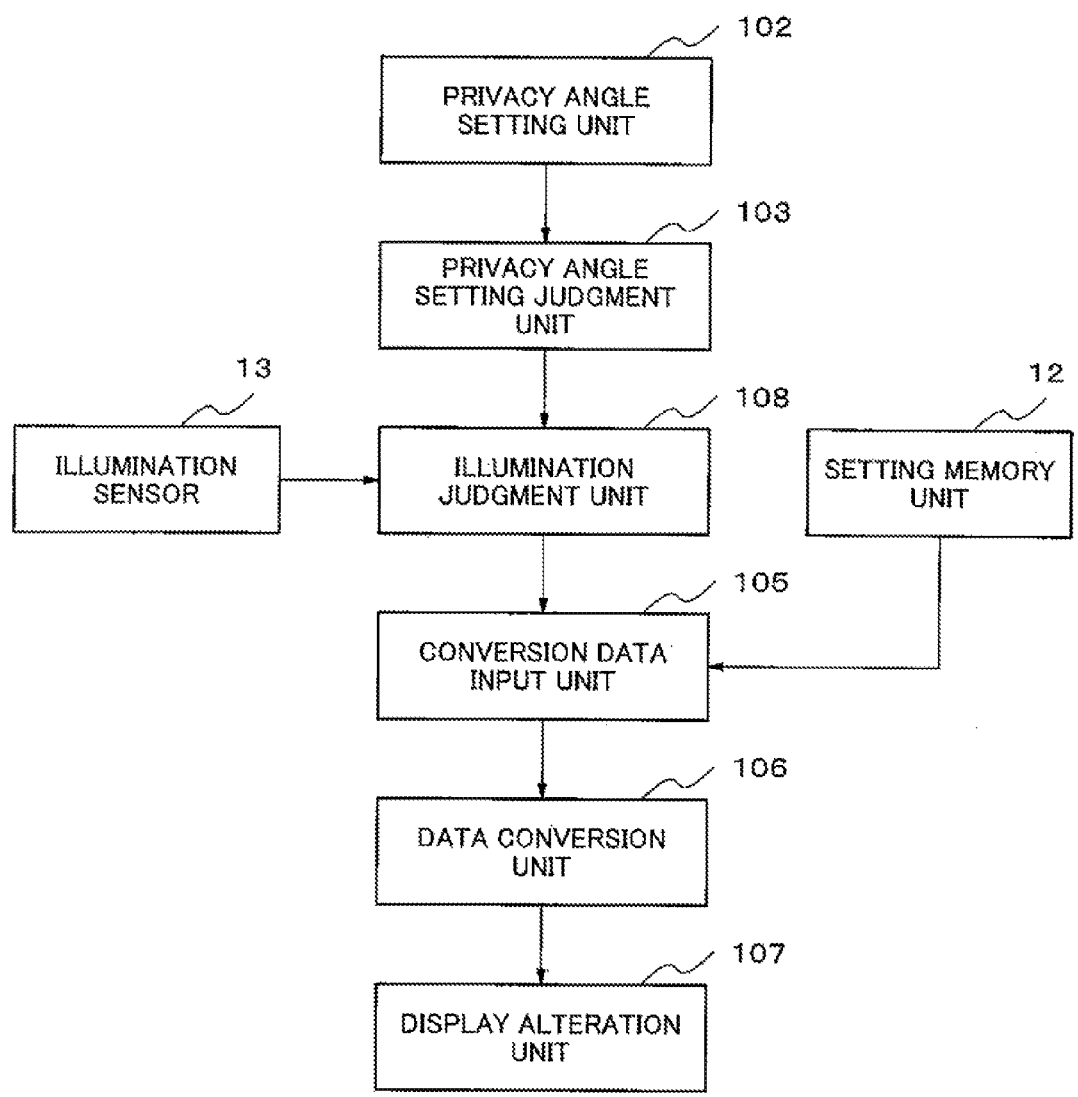
FIG. 13 is a functional block diagram of a mobile terminal using a peeking prevention method according to the third exemplary embodiment.

Next, the third exemplary embodiment of the present invention will be described with reference to a drawing. Further, concerning the same structure as the second exemplary embodiment, an identical code is used and its description will be omitted appropriately. FIG. 12 is a block diagram of the PDA using a peeking prevention method in the third exemplary embodiment. FIG. 13 is a functional block diagram of the PDA using a peeking prevention method in the third exemplary embodiment.

As indicated in FIG. 12, according to the third exemplary embodiment, it is different from the second exemplary embodiment in a point that it includes an illumination sensor 13 in addition to a structure indicated in FIG. 2. The illumination sensor 13 detects surrounding illumination and outputs a detection signal according to illumination which it detected.

As indicated in FIG. 13, according to this exemplary embodiment, it is different from the second exemplary embodiment in a point that it includes illumination judgment unit 108 instead of the user setting judgment unit 104 indicated in FIG. 3. The illumination judgment unit 108 is realized by a CPU which operates following a program.

When the privacy angle setting judgment unit 103 judges that a state of a privacy angle as on state, the illumination judgment unit 108 judges the surrounding illumination based on the detection signal from the illumination sensor 13. Also, the illumination judgment unit 108 judges automatically, based on the judged illumination, which of white group conversion data or black group conversion data to use as the conversion data.

Further, concerning functions of components other than the illumination sensor 13 and the illumination judgment unit 108, they are same as their functions indicated in the second exemplary embodiment. Also, because output data after conversion of data for display using each conversion data is same as one which are indicated in FIGS. 5-10, its description will be omitted.

Figure 14:
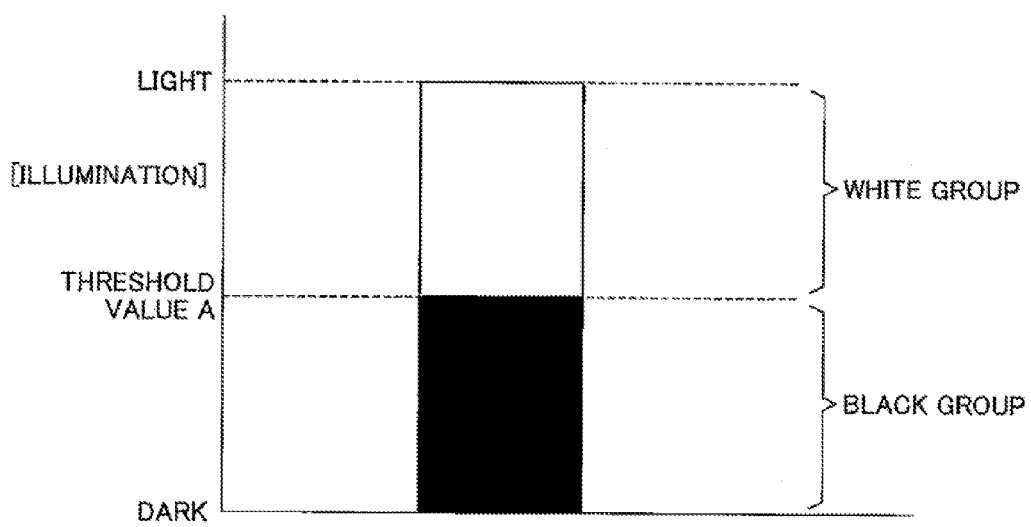
FIG. 14 is a figure showing a relation between illumination detected by an illumination sensor according to the third exemplary embodiment and a conversion color of data for display.

Next, operation will be described. FIG. 14 is an explanatory drawing showing a relation between illumination which the illumination sensor 13 in the third exemplary embodiment detects and a conversion color of data for display.

In FIG. 14, a vertical axis is the illumination which the control unit 1 recognized based on a numerical value of the detection signal from the illumination sensor 13. The display processing unit 11 of the control unit 1 changes the conversion data used for peeking prevention processing based on the numerical value of the detection signal from the illumination sensor 13.

In FIG. 14, a case is indicated where black group conversion data is used in case the illumination is of a numerical value darker than threshold value A, and white group conversion data is used in case it is of a numerical value lighter than or equal to threshold value A. Also, it is supposed that the control unit stores threshold value A in the setting memory unit 12 in advance.

Figure 15:
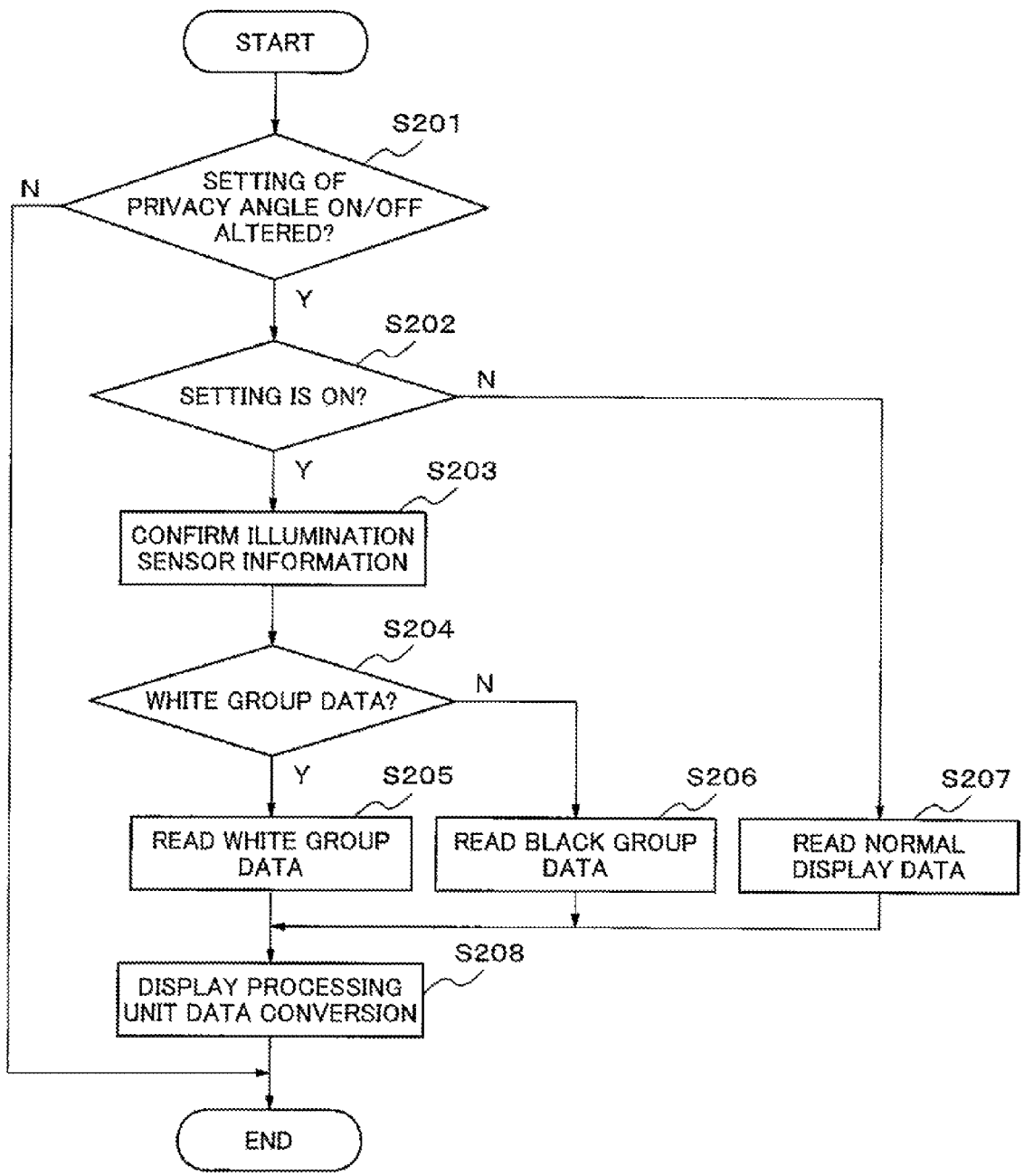
FIG. 15 is a flow chart of peeking prevention processing in a mobile terminal according to the third exemplary embodiment.

FIG. 15 is a flow chart showing peeking prevention processing in the third exemplary embodiment. In FIG. 15, processing of Steps S201 and S202 is same as processing of Steps S101 and S102 indicated in the second exemplary embodiment.

In case it judges that a privacy angle is altered to on state in Step S202, the control unit confirms a detection signal from the illumination sensor 13 (Step S203).

The control unit recognizes (judges) surrounding illumination based on the detection signal from the illumination sensor 13. Also, when the privacy angle is set to on state, the control unit judges which of white group conversion data or black group conversion data to use as the conversion data using threshold value A stored in the setting memory unit 12 (Step S204).

For example, in case it concludes that the illumination judged based on the detection signal of the illumination sensor 13 is no smaller than threshold value A (that is, surroundings are light), the control unit judges to use white group conversion data as the conversion data. Also, in case it concludes that the illumination judged based on the detection signal of the illumination sensor 13 is smaller than threshold value A (that is, surroundings are dark), the control unit judges to use black group conversion data as the data. Further, a user can set threshold value an arbitrary in advance.

The control unit performs judgment of whether to use white group conversion data in Step S204, and in case it judges to use white group conversion data, transitions to processing of Step S205. And the control unit reads white group conversion data from the setting memory unit 12 as the conversion data (Step S205).

In case it judges not to use white group conversion data in Step S201 (that is, to use black group conversion data), the control unit transitions to processing of Step S206. And the control unit reads black group conversion data from the setting memory unit 12 as the conversion data (Step S206).

In case it judges that the privacy angle is set to off state in Step S202, the control unit transitions to processing of Step S207. That is, a case it transitioned to Step S207 is when setting of the privacy angle is altered from on state to off state. Therefore, the control unit reads normal display data at normal time from the setting memory unit 12 (Step S207).

Next, the control unit stores (for example, stores in RAM and so on provided in the control unit 11) data read in Steps S205, S206 or S207 as a table for data conversion using the display processing unit 11. And the control unit makes the contrast difference small by converting the data for display displayed on the display unit 9 based on the table for data conversion stored in the display processing unit 11, and outputs the data for display after conversion to the display unit 9 (Step S208).

For example, in case white group conversion data is used, the control unit displays output data indicated in FIG. 7 and FIG. 8 on the display unit 9. Also, in case black group conversion data is used, the control unit displays output data indicated in FIG. 9 and FIG. 10 on the display unit 9. Also, in case normal display data is used, the control unit displays output data indicated in FIG. 5 and FIG. 6 on the display unit 9.

Further, in case it judges that the privacy angle is set to off state, the control unit does not perform conversion processing of Step S208, and may output the data for display to the display unit 9 just as it is. By so doing, normal display data becomes unnecessary, and a processing load can be reduced.

As described above, according to this exemplary embodiment, it is possible to alter automatically, by illumination which the illumination sensor 13 senses, a color tone of a display screen of the display unit 9 in case a privacy angle function is set as effective following a user operation. Therefore, it is possible to perform setting automatically which matches the surroundings where the user is and which is easy to see, and usability improves.

Also, it is made possible that a user can set a threshold value at the time of altering a color tone of a display screen of the display unit 9 automatically by illumination which the illumination sensor 13 senses, to the control unit in advance.

A Fourth Exemplary Embodiment

Next, the fourth exemplary embodiment of the present invention will be described with reference to a drawing. Further, concerning the same structure as the third exemplary embodiment, an identical code is used and its description will be omitted appropriately.

According to the second exemplary embodiment, illumination was judged by comparison of a detection signal from the illumination sensor 13 and one threshold value. In contrast, according to the third exemplary embodiment, the illumination is judged in three stages using two threshold values. For this reason, according to the third exemplary embodiment, the setting memory unit 12 stores white group conversion data, black group conversion data, normal display data and intermediate color group conversion data as the conversion data. This intermediate color group conversion data is conversion data for converting data for display to an intermediate color between white and black.

Next, operation will be described. FIG. 16 is an intermediate color group data conversion table in case the display processing unit 11 makes a contrast difference in data for display small so that it may near an intermediate color overall. That is, in FIG. 16, a case where a privacy angle is set to on state and intermediate color group conversion data is set to be used as the conversion data is indicated.

As indicated in FIG. 16, in case intermediate color group conversion data is used, data conversion is performed so that the contrast difference in the data is made small overall against the original data and a numerical value of RGB may near a darker gray group compared with a white group (conversely, near a lighter gray group compared with a black group).

Figure 17:
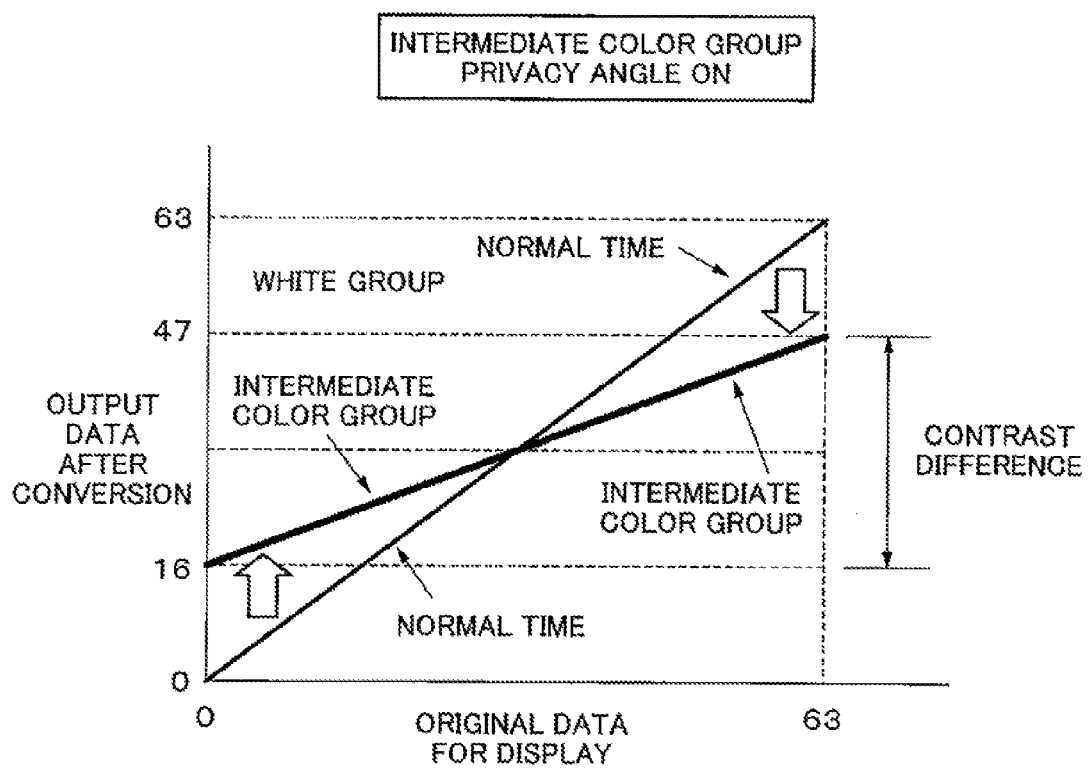
FIG. 17 is output data after converting data for display using intermediate color group conversion data according to the third exemplary embodiment.

FIG. 17 is output data after converting the data for display using intermediate color group conversion data. Further, in FIG. 17, output data at normal time and output data which is converted using intermediate group conversion data are indicated together so that they can be compared. Output data at normal time is output data when the privacy angle is set to off state. Output data which is converted using intermediate color group conversion data is output data when the privacy angle is in on state and in case setting to the effect that intermediate color group conversion data is to be used is set.

As indicated in FIG. 17, while the contrast difference in output data at normal time is in 64 stages from 0 to 63, the contrast difference in output data of an intermediate color group is in 32 stages from 16 to 17. Accordingly, the contrast difference after conversion becomes small and a display screen becomes difficult to be seen (peeking prevention effect can be obtained).

Further, in FIG. 17, a case is indicated where the contrast difference after conversion becomes half of the difference in the numerical value of RGB of the original data. However, to which extent the contrast difference may be made small is not limited to the one indicated in this exemplary embodiment and, for example, one which makes it small to ⅓ or ⅔ of the difference in the numerical value of RGB of the original data may also be fine.

Figure 18:
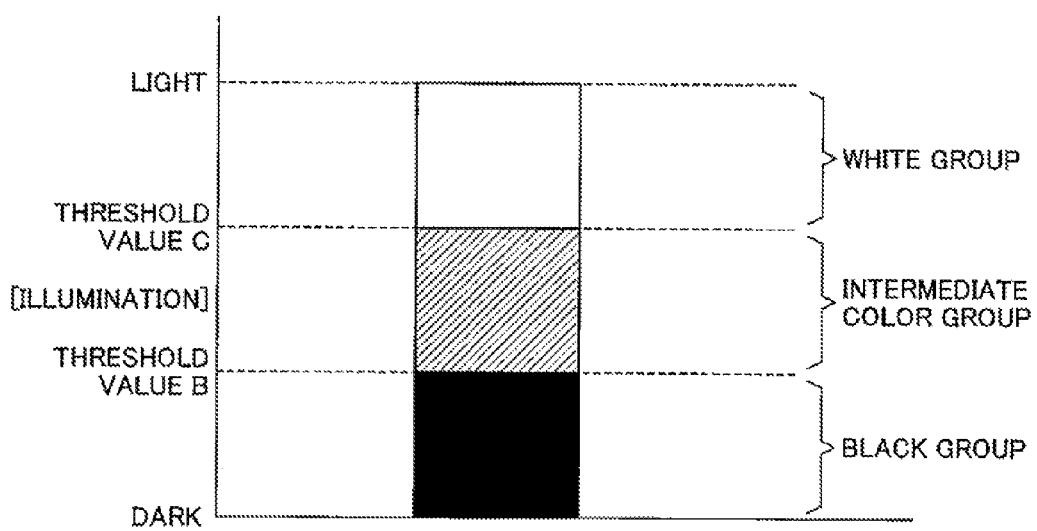
FIG. 18 is a figure showing a relation between illumination detected by an illumination sensor according to a fourth exemplary embodiment of the present invention and a conversion color of data for display.

Next, operation will be described. FIG. 18 is a figure showing a relation between illumination which the illumination sensor 13 in the fourth exemplary embodiment detects and a conversion color of data for display.

In FIG. 18, a vertical axis is the illumination which the control unit 1 recognized based on a numerical value of the detection signal from the illumination sensor 13. The display processing unit 11 of the control unit 1 changes the conversion data used for peeking prevention processing based on the numerical value of the detection signal from the illumination sensor 13.

In FIG. 18, a case is indicated where black group conversion data is used in case the illumination is of a numerical value darker than threshold value B, intermediate color group conversion data is used in case it is of a numerical value which indicates brightness no smaller than threshold value B and less than threshold value C, and white group conversion data is used in case it is of a numerical value which indicates brightness no smaller than threshold value C. Also, it is supposed that the control unit stores threshold value B and threshold value C in the setting memory unit 12 in advance.

Figure 19:
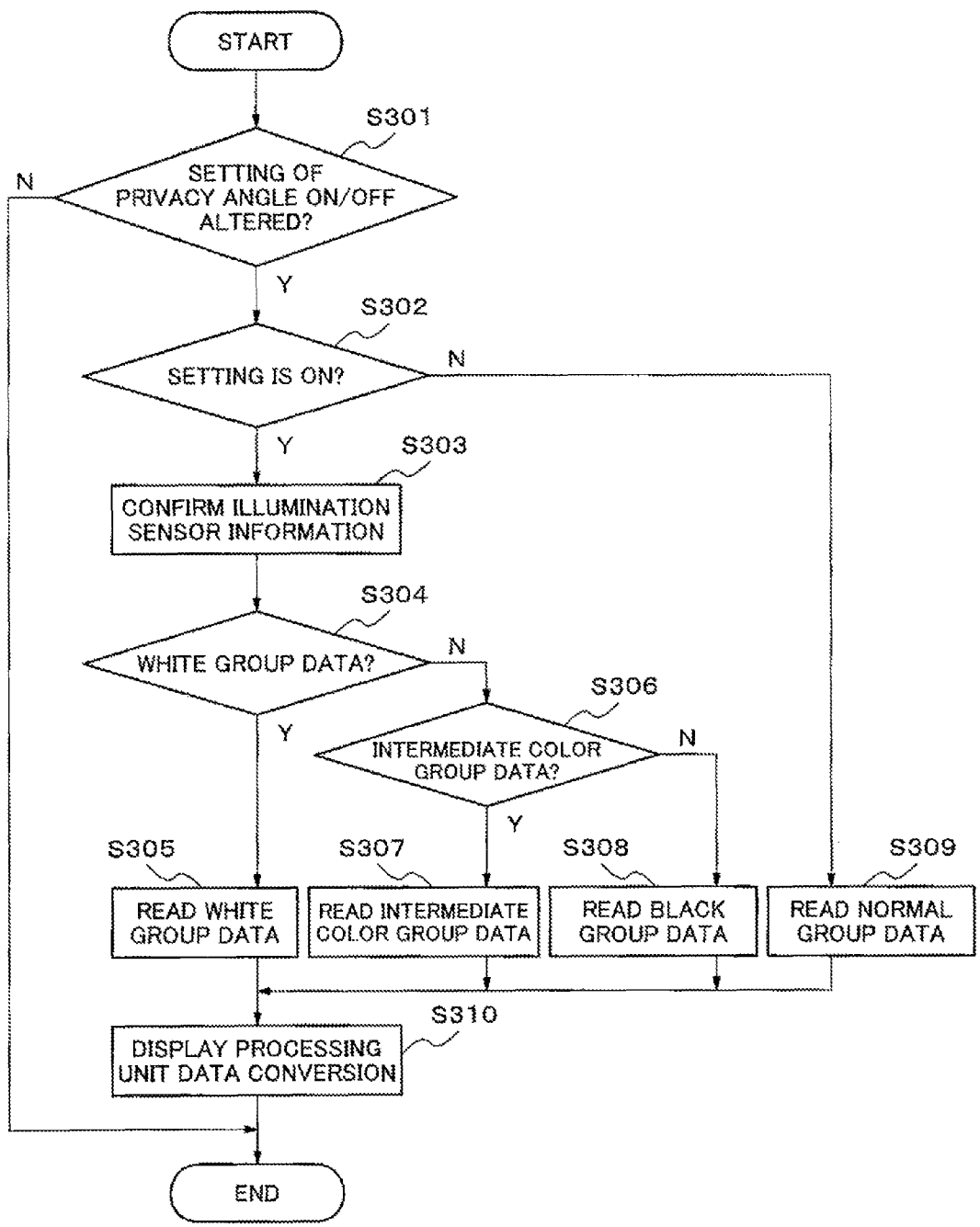
FIG. 19 is a flow chart of peeking prevention processing in a mobile terminal according to the fourth exemplary embodiment.

FIG. 19 is a flow chart showing peeking prevention processing which the control unit in the fourth exemplary embodiment performs. In FIG. 19, processing of Steps S301 and S302 is same as processing of Steps S101 and S102 indicated in the second exemplary embodiment.

In case it judges that a privacy angle is altered to on state in Step S302, the control unit confirms a detection signal from the illumination sensor 13 (Step S303).

That is, the control unit recognizes (judges) surrounding illumination of the control unit based on the detection signal from the illumination sensor 13. Also, when the privacy angle is set to on state, the control unit judges whether to use white group conversion data as the conversion data using threshold value B and threshold value C stored in the setting memory unit. 12 (Step S304).

For example, in case it concludes that the illumination judged based on the detection signal of the illumination sensor 13 is no smaller than threshold value C (that is, surroundings are light), the control unit judges to use white group conversion data as the conversion data. The control unit performs judgment of whether to use white group conversion data in Step S304, and in case it judges to use white group conversion data, transitions to processing of Step S305.

And the control unit reads white group conversion data from the setting memory unit 12 as the conversion data (Step S305). In case it judges not to use white group conversion data in Step S304, the control unit judges whether to use intermediate color group conversion data as the conversion data (Step S306).

For example, in case it concludes that the illumination judged based on the detection signal of the illumination sensor 13 is no smaller than threshold value B and less than threshold value C (that is, brightness of the surroundings is brightness of an intermediate color), the control unit judges to use intermediate color group conversion data as the conversion data.

The control unit performs judgment of whether to use intermediate color group conversion data in Step S306, and in case it judges to use intermediate color group conversion data, transitions to processing of Step S307. And the control unit reads intermediate color group conversion data from the setting memory unit 12 as the conversion data (Step S307).

In case it judges not to use intermediate color group conversion data in Step S306 (that is, to use black group conversion data), the control unit transitions to processing of Step S308. And the control unit reads black group conversion data from the setting memory unit 12 as the conversion data (Step S308).

Further, a user can set information on threshold value B and threshold value C arbitrary in advance. In case it judges that the privacy angle is set to off state in Step S302, the control unit transitions to processing of Step S309. That is, this case is when setting of the privacy angle is altered from on state to off state. Therefore, the control unit reads normal display data at normal time from the setting memory unit 12 (Step S309).

Next, the control unit stores (for example, stores in RAM and so on provided in the control unit 11) data read in Steps S305, S307, S308 or S309 as a table for data conversions using the display processing unit 11. And the control unit makes the contrast difference small by converting the data for display displayed on the display unit 9 based on the table for data conversion stored in the display processing unit 11, and outputs the data for display after conversion to the display unit 9 (Step S310).

For example, in case white group conversion data is used, the control unit displays output data indicated in FIG. 7 and FIG. 8 on the display unit 9. Also, in case intermediate color group conversion data is used, the control unit displays output data indicated in FIG. 16 and FIG. 1.7 on the display unit 9. Also, in case black group conversion data is used, the control unit displays output data indicated in FIG. 9 and FIG. 10 on the display unit 9. Also, in case normal display data is used, the control unit displays output data indicated in FIG. 5 and FIG. 6 on the display unit 9.

Further, in case it judges that the privacy angle is set to off state, the control unit does not perform conversion processing of Step S310, and may output the data for display to the display unit 9 just as it is. By so doing, normal display data becomes unnecessary, and a processing load can be reduced.

Also, according to this exemplary embodiment, although a case was indicated where two threshold values are used to compare with illumination based on a detection signal of the illumination sensor, and a contrast difference is converted into three stages of white, black and an intermediate color, a number of the threshold value used and a way of conversion of the contrast difference are not limited to the one indicated in this exemplary embodiment. For example, it may be structured using no smaller than three threshold values and the contrast difference may be converted further into no smaller than four stages.

As described above, according to this exemplary embodiment, it is possible to alter automatically, by illumination which the illumination sensor 13 senses, a color tone of a display screen of the display unit 9 in case a privacy angle function is set as effective following a user operation.

Also, it is possible to store several threshold values at the time of altering the color tone of the display screen of the display unit 9 automatically. Therefore, it is possible to perform setting automatically which matches the surroundings where the user is and which is easy to see, and usability improves.

Also, it is made possible that a user can set to the control unit in advance a plurality of threshold values at the time of altering the color tone of the display screen of the display unit 9 automatically by the illumination which the illumination sensor 13 senses.

Further, according to each exemplary embodiment indicated above, characteristic structures of the PDA as indicated in (1)-(8) are indicated.

(1) The PDA is characterized by including a conversion data setting unit (for example, realized by the user setting unit 101) which sets which conversion data to use as the conversion data for converting a contrast difference in data for display out of a plurality of conversion data, a data conversion unit (for example, realized by the data conversion unit 100 which performs processing which makes the contrast difference in the data for display small using the conversion data set by the conversion data setting unit, and a display alteration unit (for example, realized by the display alteration unit 107) which alters a displayed content on a display screen based on the data for display converted by the data conversion unit.

(2) In the PDA, the conversion data setting unit may be structured so that it sets which conversion data to use as the conversion data out of white group conversion data for converting the contrast difference so that the display screen may near white overall and black group conversion data for converting the contrast difference so that the display screen may near black overall.

(3) The PDA may be structured to include a conversion data judgment unit (for example, realized by the illumination judgment unit 108) which judges surrounding illumination using an illumination sensor (for example, the illumination sensor 13) and judges which conversion data to use as the conversion data for converting a contrast difference in data for display out of a plurality of conversion data based on the judged illumination, a data conversion unit (for example, realized by the data conversion unit 106) which performs processing which makes the contrast difference in the data for display small using the conversion data judged by the conversion data judgment unit, and a display alteration unit (for example, realized by the display alteration unit 107) which alters a displayed content on a display screen based on the data for display converted by the data conversion unit.

(4) In the PDA, the conversion data judgment unit may be structured so that it may judge which conversion data to use as the conversion data out of white group conversion data for converting the contrast difference so that the display screen may near white overall and black group conversion data for converting the contrast difference so that the display screen may near black overall.

(5) In the PDA, the conversion data judgment unit may be structured so that it may judge whether the illumination is no smaller than a predetermined threshold value (for example, threshold value A), and it may judge which conversion data to use out of a plurality of conversion data based on the judgment result of whether the illumination is no smaller than the predetermined threshold value.

(6) In the PDA, the conversion data judgment unit may be structured so that, when it judges that the illumination is no smaller than the predetermined threshold value, judges to use as the conversion data white group conversion data for converting the contrast difference so that the display screen may near white overall, and when it judges that the illumination is less than the predetermined threshold value, judges to use as the conversion data black group conversion data for converting the contrast difference so that the display screen may near black overall.

(7) In the PDA, the conversion data judgment unit may be structured so that it performs processing which compares the illumination with a plurality of threshold values, and based on the result of comparing the illumination with a plurality of threshold values, judges which conversion data to use out of a plurality of conversion data.

(8) In the PDA, the conversion data judgment unit may be structured so that, when it judges that the illumination is no smaller than a first threshold value (for example, threshold value C), it judges to use as the conversion data white group conversion data for converting the contrast difference so that the display screen may near white overall, when it judges that the illumination is less than the first threshold value and is no smaller than a second threshold value (for example, threshold value B), it judges to use as the conversion data intermediate color group conversion data for converting the contrast difference so that the display screen may near an intermediate color between white and black overall, and when it judges that the illumination is less than the second threshold value, it judges to use as the conversion data black group conversion data for converting the contrast difference so that the display screen may near black overall.

The present invention mentioned above can be applied for the purpose of, in case a peeking prevention function is made operate following a user operation, displaying on a display device according to a display method which corresponds to a condition which the user has set in advance. Although the present invention has been described with reference to each exemplary embodiment as above, the present invention is not limited to the exemplary embodiment and the example mentioned above.

In the composition of the present invention and details, various changes may be performed within the scope of the present invention and to the extent a person skilled in the art can understand.

This application is the National Phase of PCT/JP2009/071081, filed Dec. 14, 2009, which is based upon and claims the benefit of priority from Japanese patent application No. 2009-014431, filed on Jan. 26, 2009, the disclosure of which is incorporated herein in its entirety by reference.

DESCRIPTION OF SYMBOL 1 control unit
2 wireless unit
3 antenna unit
4 power supply unit
5 transmission unit
6 reception unit
7 speaker
8 operation unit
9 display unit
10 memory device
11 display processing unit.
12 setting memory unit
13 illumination sensor
101 user setting unit
102 privacy angle setting unit
103 privacy angle setting judgment unit
104 user setting judgment unit
105 conversion data input unit
106 data conversion unit
107 Display conversion unit
108 illumination judgment unit

The invention claimed is:

1. A mobile terminal, comprising:
a conversion data setting unit which sets which conversion data to use as the conversion data for converting a contrast difference in data for display out of a plurality of the conversion data, the conversion data including first white conversion data, black conversion data, and second white conversion data;
a data conversion unit which performs processing which makes the contrast difference in the data for display uniformly small using the conversion data set by the conversion data setting unit, the processing including:
black processing using the black conversion data to decrease a black group range of the data from an original black range between an original most black level and an original least black level to a new black range between the original most black level and a new least black level that is greater than the original least black level;
first white processing using the first white conversion data to decrease a white group range of the data from an original white range between an original most white level and an original least white level to a new white range between a new most white level that is less than the original most white level and the original least white level;
second white processing using the second white conversion data to decrease the white group range of the data from the original white range to another new white range between another new most white level that is less than the original most white level and a new least white value that is greater than the original least white level; and
a display alteration unit which alters a displayed content on a display screen based on the data for display converted by the data conversion unit, by selecting one of the black processing, the first white processing, and the second white processing based on an ambient light condition to decrease visibility of the displayed content.

2. The mobile terminal of claim 1, further comprising an illumination sensor detecting surrounding illumination of the mobile terminal that is used as the ambient light condition.

3. The mobile terminal of claim 1, wherein:
in response to the ambient light condition indicating a surrounding illumination being greater than a threshold value, the display alteration unit selects the first white processing,
and in response to the ambient light condition indicating the surrounding illumination being less than the threshold value, the display alteration unit selects the black processing.

4. The mobile terminal of claim 1, wherein:
in response to the ambient light condition indicating a surrounding illumination being greater than a first threshold value, the display alteration unit selects the first white processing,
in response to the ambient light condition indicating the surrounding illumination being less than a second threshold value that is less than the first threshold value, the display alteration unit selects the black processing,
and in response to the ambient light condition indicating the surrounding illumination being between the first threshold value and the second threshold value, the display alteration unit selects the second white processing.

5. A mobile terminal, comprising:
a conversion data judgment unit which judges surrounding illumination using an illumination sensor, and judges which conversion data to use as the conversion data for converting a contrast difference in data for display out of a plurality of conversion data based on the judged illumination;
a data conversion unit which performs processing which makes the contrast difference in the data for display uniformly small using the conversion data judged by the conversion data judgment unit, the processing including:
black processing using the black conversion data to decrease a black group range of the data from an original black range between an original most black level and an original least black level to a new black range between the original most black level and a new least black level that is greater than the original least black level;

first white processing using the first white conversion data to decrease a white group range of the data from an original white range between an original most white level and an original least white level to a new white range between a new most white level that is less than the original most white level and the original least white level;

second white processing using the second white conversion data to decrease the white group range of the data from the original white range to another new white range between another new most white level that is less than the original most white level and a new least white value that is greater than the original least white level; and a display alteration unit which alters a displayed content on a display screen based on the data for display converted by the data conversion unit, by selecting one of the black processing, the first white processing, and the second white processing based on an ambient light condition indicated by the surrounding illumination, to decrease visibility of the displayed content.

6. The mobile terminal of claim 5, wherein:

in response to the surrounding illumination being greater than a threshold value, the display alteration unit selects the first white processing, and in response to the surrounding illumination being less than the threshold value, the display alteration unit selects the black processing.

7. The mobile terminal of claim 5, wherein:

in response to the surrounding illumination being greater than a first threshold value, the display alteration unit selects the first white processing, in response to the surrounding illumination being less than a second threshold value that is less than the first threshold value, the display alteration unit selects the black processing, and in response to the surrounding illumination being between the first threshold value and the second threshold value, the display alteration unit selects the second white processing.

8. A peeking prevention method, comprising:

a conversion data setting step for setting which conversion data to use as the conversion data for converting a contrast difference in data for display out of a plurality of conversion data the conversion data including first white conversion data, black conversion data, and second white conversion data;

a data conversion step for performing processing which makes the contrast difference in the data for display uniformly small using the set conversion data, the processing including:

black processing using the black conversion data to decrease a black group range of the data from an original black range between an original most black level and an original least black level to a new black range between the original most black level and a new least black level that is greater than the original least black level;

first white processing using the first white conversion data to decrease a white group range of the data from an original white range between an original most white level and an original least white level to a new white range between a new most white level that is less than the original most white level and the original least white level;

second white processing using the second white conversion data to decrease the white group range of the data from the original white range to another new white range between another new most white level that is less than the original most white level and a new least white value that is greater than the original least white level; and a display alteration step for altering a displayed content on a display screen based on converted the data for display, by selecting one of the black processing, the first white processing, and the second white processing based on an ambient light condition indicated by the surrounding illumination, to decrease visibility of the displayed content.

9. The peeking prevention method of claim 8, further comprising an illumination sensing step of detecting surrounding illumination that is used as the ambient light condition.

10. The peeking prevention method of claim 8, wherein:

in response to the ambient light condition indicating a surrounding illumination being greater than a threshold value, the display alteration step selects the first white processing, and in response to the ambient light condition indicating the surrounding illumination being less than the threshold value, the display alteration step selects the black processing.

11. The peeking prevention method of claim 8, wherein:

in response to the ambient light condition indicating a surrounding illumination being greater than a first threshold value, the display alteration step selects the first white processing, in response to the ambient light condition indicating the surrounding illumination being less than a second threshold value that is less than the first threshold value, the display alteration step selects the black processing, and in response to the ambient light condition indicating the surrounding illumination being between the first threshold value and the second threshold value, the display alteration step selects the second white processing.

* * * * *

UNITED STATES PATENT AND TRADEMARK OFFICE
CERTIFICATE OF CORRECTION

PATENT NO. : 8,810,609 B2
APPLICATION NO. : 13/144486
DATED : August 19, 2014
INVENTOR(S) : Mamoru Shimazaki Page 1 of 1

It is certified that error appears in the above-identified patent and that said Letters Patent is hereby corrected as shown below:

In the Specification

Column 1, Line 59: Delete "2008-20730" and insert -- 2008-20750 --

Column 2, Line 9: Delete "pecking" and insert -- peeking --

Column 5, Line 57: Delete "1," and insert -- 4, --

Column 6, Line 23: Delete "RDA" and insert -- PDA --

Column 12, Line 22: Delete "the" and insert -- the conversion --

Column 15, Line 24: Delete "1.7" and insert -- 17 --

Signed and Sealed this
Third Day of March, 2015

Michelle K. Lee
*Deputy Director of the United States Patent and Trademark Office*